United States Patent [19]

Costrop et al.

[11] Patent Number: 5,194,898
[45] Date of Patent: Mar. 16, 1993

[54] OPTICAL SCANNING APPARATUS HAVING MEANS TO STABILIZE OPTICAL UNIT AGAINST THE PLATEN

[75] Inventors: Dirk L. Costrop, Duffel; Frank C. Trouillard, Lint, both of Belgium

[73] Assignee: Agfa-Gevaert N.V., Mortsel, Belgium

[21] Appl. No.: 844,290

[22] Filed: Mar. 2, 1992

[30] Foreign Application Priority Data

Mar. 12, 1991 [EP] European Pat. Off. ........ 91200531.1

[51] Int. Cl.⁵ .............................................. G03G 15/28
[52] U.S. Cl. ...................... 355/236; 355/75; 355/76; 355/233; 358/474
[58] Field of Search .............. 346/108; 355/72, 73, 355/75, 76, 230, 233, 234, 235, 236; 358/474, 494, 496, 497

[56] References Cited

U.S. PATENT DOCUMENTS

| | | | |
|---|---|---|---|
| 4,623,937 | 11/1986 | Watanabe | 358/483 |
| 4,870,502 | 9/1989 | Dreinhoff et al. | 358/474 |
| 4,982,236 | 1/1991 | Bock | 355/235 |
| 5,081,497 | 1/1992 | Agarwal et al. | 355/75 X |

Primary Examiner—A. T. Grimley
Assistant Examiner—J. E. Barlow, Jr.
Attorney, Agent, or Firm—William J. Daniel

[57] ABSTRACT

An optical scanning apparatus for scanning image information of a document on a document support (D) and a scanning unit (50) being positively guided along a predetermined scanning path; characterized in that said scanning unit has bearing members (30) for making contact with a face of said document or document support and thereby determining the optical distance between that face and said focusing means (10), and in that said unit is mounted so that it is under biasing forces which maintain its said bearing members in running contact with said document or document support during a scanning movement of the unit.

14 Claims, 7 Drawing Sheets

OPTICAL SCANNING APPARATUS HAVING MEANS TO STABILIZE OPTICAL UNIT AGAINST THE PLATEN

BACKGROUND OF THE INVENTION

The invention relates to optical scanning apparatus comprising means for scanning a document to produce optical image signals and means for sensing such signals for recording purposes.

The invention includes apparatus wherein there is means which utilises the optical image signals for forming an electrostatic charge image and means for developing such charge image thereby to produce a visible reproduction of the scanned document. The invention also includes apparatus comprising transducing means for converting the optical image signals into electric signals for transmission to a recorder, e.g. a printer or visual display unit.

Document scanners are known which comprise a bodily stationary transparent document supporting plate and a scanning unit which is mounted for bodily movement parallel with and close to the plate. In use, a light image of a line across the document is focused within the unit onto the optical sensing means so that the document is scanned line by line during a scanning displacement of the unit.

Document scanners are also known which differ from those just referred to in that the scanning unit is fixed and the document supporting plate is mounted for to and fro movement relative to said unit.

With both fixed plate and movable plate apparatus the degree of fidelity with which the information presented by the scanned document is recorded depends on the accuracy with which the document or the scanning unit as the case may be is guided during the scanning operation. The reproduction is liable to be impaired even by small changes in either the direction of relative scanning movement or the spacing between the document and the image-focusing means of the scanning unit from one moment to another in the scanning operation.

The permissible tolerance depends on the quality standards to be met by the document record. For most routine document copying purposes, high precision guidance is not necessary, but in scanners to be used for the production of prints or printing plates for the graphic industry and scanners for generating electrical image information signals for onward processing, much greater accuracy is required. For optimum results, it is necessary to ensure not only that the direction of relative displacement of the document and the image-focusing system is constant but also that each line of the document, at the moment it is exposed, is in a plane coinciding with the object plane of that focusing system. Deviations from such plane not only result in imperfect focusing of the optical image but also result in variations in the illumination intensity of the document. The closer that document is to the illuminating light source, the more sensitive is the document illumination intensity to variations in the distance of the document from such source.

In practice, there is a problem in avoiding the deviations above referred to.

For apparatus comprising a movable document supporting plate, a solution to the that problem has been proposed in our co-pending European Patent Application No 90 200 670.9. The present invention provides a solution to the problem in relation to apparatus having a fixed document supporting plate.

It has been proposed to guide a scanning unit along a predetermined path by means of supporting parallel rails running along opposite sides of such path. For example, U.S. Pat. No. 4,623,937 discloses scanning apparatus wherein one such rail is in the form of a cylindrical bar which extends through a guide passage in a bearing block on one side of the unit, while the other rail provides a flat running surface for a roller mounted on the other side of the unit. The use of such rails and the mounting of the document supporting plate as proposed in that patent would make it very difficult if not impossible to comply with very low tolerance conditions in regard to the location of the document relative to the object plane of the optical focusing system.

U.S. Pat. No. 4,870,502 proposes apparatus wherein the document supporting plate and the scanning unit are supported by the same fabricated parts of the apparatus frame, these parts being in the form of profiled rails having upper and lower flanges. The upper flanges of the two rails serve to support the document supporting plate. The lower flanges serve as tracks for rollers mounted on the scanning unit. Both the path of movement of the scanning unit and the distance between the document and the object plane of the optical focusing system depend on the precision of the geometry of the profiled rails and their assembly in the apparatus. In practice it would be very difficult reliably to achieve a very high standard of accuracy in this way, especially in apparatus produced on a mass production basis.

OBJECT OF THE INVENTION

It is an object of the present invention to provide apparatus having features which make it easier to attain very high standards of accuracy in respect of the guidance of the scanning unit.

According to the present invention there is provided optical scanning apparatus wherein there is a document support, a light source for irradiating a document located against said support, a scanning unit, means for positively guiding said unit along a predetermined scanning path relative to said document support, and means for driving said unit along said path; said scanning unit comprising light-sensitive means and focusing means which during a scanning movement of the unit successively exposes said light-sensitive means to light images of successive lines of information displayed by said document; characterised in that said scanning unit has bearing members for making bearing contact with a face of said document or document support and thereby determining the optical distance between that face and said focusing means, and in that said unit is mounted so that it is under (a) biasing force(s) which maintain(s) its said bearing members in running contact with said document or document support during a scanning movement of the unit.

When apparatus according to the invention is in use, the optical distance (i.e. the length of the path of the imaging light rays) between the focusing means and a transverse line across the document or document support is determined by the positions of the bearing members of the unit relative to the focusing means. This feature facilitates attainment or very close approximation to the ideal condition for exposing the light-sensitive means to perfectly sharp document line images and hence producing very high fidelity records. The ideal condition is of course one wherein at every instant during a scanning operation, all points along the imaged line of the document are in the object plane of the focusing means.

The document-irradiating light source of apparatus according to the invention is preferably located on the same side of the document support as the scanning unit so that the document line images transmitted to the light-sensitive means are reflected light images. And preferably such light source is carried by the scanning unit itself.

It is very beneficial for the bearing members of the scanning unit to make local bearing contact with the document or document support at positions abreast of the opposite ends of the object line of the focusing means. The localising of the bearing contact at such positions further contributes to focusing accuracy.

The bearing members of apparatus according to the invention can for example be in the form of rollers or low-friction blocks or pads.

Preferably the scanning unit is mounted so that it is free to undergo lateral rocking movement against the aforesaid biasing force or forces. By lateral rocking movement is meant rocking movements in planes transverse to the scanning path. The freedom of the scanning unit to undergo lateral rocking movement ensures that the orientation of the unit will be automatically adjusted in response to certain kinds of imperfections, if they exist, in the planeity of the surface contacted by the bearing members of the unit.

It is much preferred for the scanning unit to be mounted so that it is free not only for lateral rocking movement as aforesaid but also for fore-to-aft rocking movements, also against the biasing force or forces. fore-to-aft rocking movements are movements in planes parallel with the scanning path and normal to the document support. This additional freedom of motion during the positively guided scanning movement of the unit makes focusing accuracy independent or less dependent on other kinds of imperfections, if they exist, in the planeity of the surface contacted by the bearing members of the unit.

It will be understood that where reference is made herein to rocking movements of the scanning unit, the movements envisaged are of extremely small magnitude. Their occurrence and extent will be determined by the standard of planeity of the face of the document support against which the scanning unit bears, via its bearing members, with or without the interposition of a document to be scanned.

The biasing force which maintains bearing contact of the scanning unit with the document or document support can for example be exerted by spring means of mechanical, pneumatic or hydraulic type.

A preferred form of guide means which can be used in apparatus according to the invention comprises a mono-rail track and a tracking member which co-operates with the rail to form a coupling which is located centrally of the width of said scanning path, said coupling being substantially without free play but permitting lateral rocking movements of the tracking member around the axis of said rail, and the scanning unit is connected to said tracking member by hinge means which allows fore-aft rocking movement of said unit relative to the guide rail. It is advantageous for the said track to be formed by a guide rail of generally circular section and for the tracking member to be constituted by a high-precision ball bushing, e.g. a ball bushing as marketed under the Trade Mark "STAR-Super-Kugel-buchsen" by Deutsche Star GmbH of D-8720 Schweinfurt 1, Germany. Such bushings can restrict radial play to about 0.01 to 0.02 mm. Moreover they can be of a kind permitting diameter adjustment by means of an adjustment screw whereby play can be virtually totally eliminated.

In certain embodiments of the invention the document support is located above the scanning path of the scanning unit, and the biasing force or forces is or are exerted by spring means which urges the unit upwardly towards said support. Preferably such spring means comprises independent springs disposed at opposite sides of an axis about which the scanning unit is free to undergo lateral rocking movement. The independent springs can carry support members, e.g. wheels or rollers, which run in contact with one or more fixed parts of the apparatus, such as a bottom wall of an outer casing of the apparatus or parts of a main apparatus frame.

The document support can be in the form of a light-transmitting plate on the top face of which a document can be placed for scanning. If a document is located on the top face of the plate and the scanning unit makes bearing contact with the bottom of the plate as above referred to, imperfections in the focusing accuracy can be caused by lack of uniformity of thickness of the said plate. However, light-transmitting plates are available whose thickness is uniform within very low tolerances. For example, flat glass plates of very high standard in respect of both surface planeity and uniformity of thickness are available and can be used for the purpose.

The invention however includes apparatus wherein the scanning unit is urged upwardly towards the document support and the bottom face of such support is accessible to permit a document to be held against that face for scanning. In that case, any thickness variations in the document supporting plate are of no consequence for the image focusing accuracy. And of course the document support does not need to be light-transmitting. If a document to be scanned has a width (measured normally to the scanning path) which is large enough, the bearing members of the scanning unit can run in direct contact with the document itself. The document supporting plate can for example be mounted so that it is displaceable from its operative position into an inoperative position which gives convenient access to its bottom face for receiving the document to be scanned.

A document can be held flat against the underside of a support as aforesaid by various means. For example, adhesive tape can be used for this purpose.

The invention also includes apparatus wherein the document support is located above the scanning path of the scanning unit, the bearing members of that unit bear against the top face of that support or a document thereon, The weight of the unit itself and/or spring means can exert the biasing force or forces maintaining such bearing contact during a scanning operation. Such an arrangement is conducive to very high focusing accuracy while at the same time making it very easy to position a document for scanning.

The document support of apparatus according to the invention can form part of a vacuum box in which aspirating force can be induced to hold a document in close contact with such support. The use of vacuum for holding documents against a support is well known per se in the art of reprography. Following that known technology, the document support will have one or more openings therein through which air can be aspirated and will form part of a vacuum box connected to a vacuum pump. In the case of apparatus in which a document is located against the bottom face of a document support for scanning, the use of a vacuum technique for holding the document in that position makes it possible to dispense with the necessity for the document support to be displaceable from its operative position for loading a document into the apparatus. The apparatus can permit the document to be slidden into the space between the vacuum box and the scanning unit prior to the exertion of the aspirating force. That advantage is of importance because in carrying out the present invention it is much preferred for the document support to be permanently held in a predetermined position, relative to the scanning path of the scanning unit.

Certain embodiments of the invention, selected by way of example, will now be described with reference to the accompanying diagrammatic drawings, in which:

FIG. 3b shows a modification of the detail shown in FIG. 3a;

Reference is firstly made to the apparatus shown in FIGS. 1 to 5. As appears from FIG. 1 the apparatus comprises an outer casing 1 at the top of which there is a clear glass plate 2 on which is placed a document D to be scanned. Within the outer casing 1 there is a scanning unit 3 in which there is a light box 4. At the top of this box there is a light-transmitting opening or window 5 and in the bottom of the box there is an exposure slot 6. Said opening 5 and slot 6 extend transversely across the box.

Figure 1:
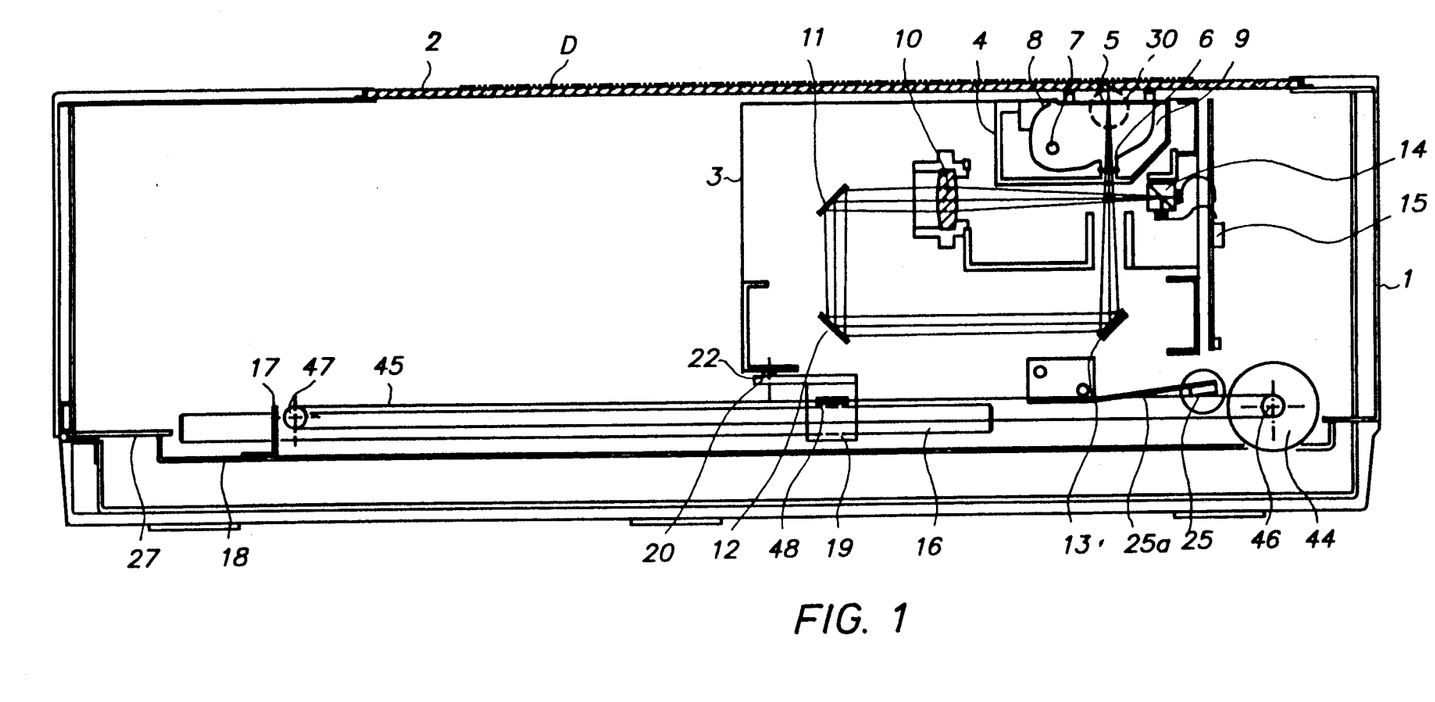
FIG. 1 represent parts of an apparatus according to the invention in sectional elevation.
Figure 2:
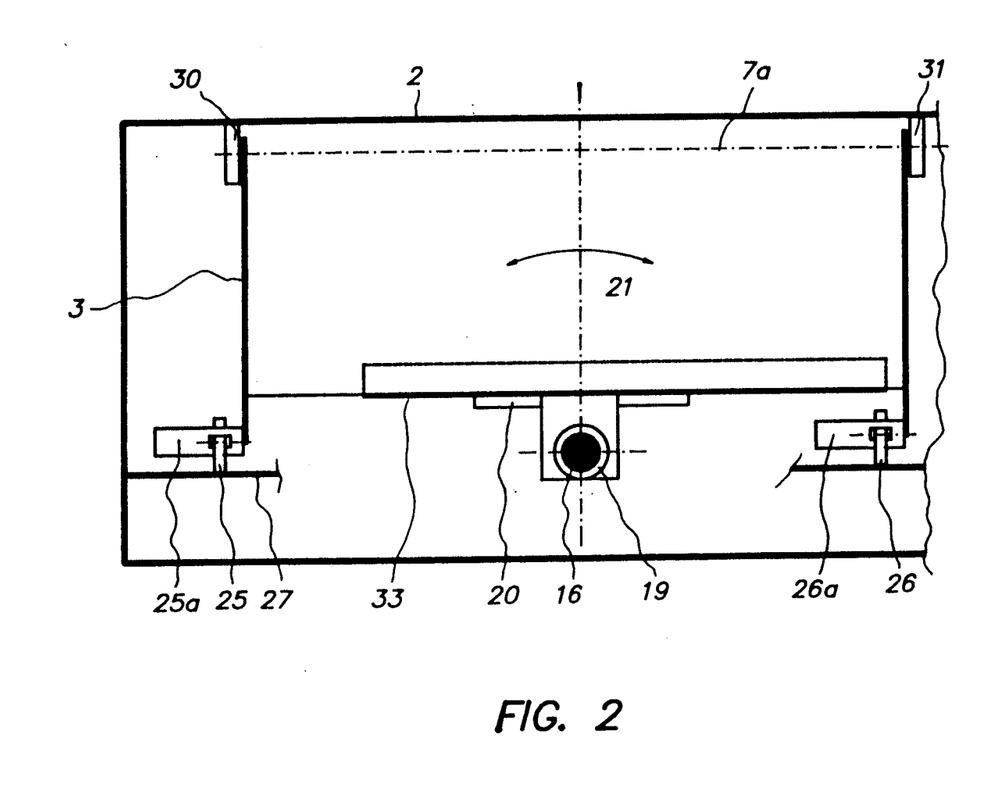
FIG. 2 is a partial end sectional elevation of those parts.

Within the light-box 4 there is a tubular lamp 7 whose axis is in a horizontal plane indicated by the chain line 7a in FIG. 2, and reflectors 8 and 9 which direct light upwardly through the opening 5.

Also within the scanning unit there is an optical focusing means comprising a lens 10 and mirrors 11,12 and 13. The lens is focused so that its focal plane coincides with the top face of the document support 2. The object of the lens is a notional line located in that plane and running transversely of such support, directly above the exposure slot 6. During a scanning operation, as that notional object line registers with each of the successive lines of the document, a sharp light image of that document line is focused on a light sensor array 14 which transduces the incident light signals into electrical signals which are conducted to output terminals 15. These terminals are connected to output lines (not shown) via which the signals are transmitted to means whereby they are processed, e.g. to a visual display unit, a photographic printing apparatus for producing a visible or developable latent image on a printing plate or other element, a thermographic printer or a facsimile apparatus.

At a level beneath the scanning unit casing, there is a circular section rail 16 which is held by a bracket 17 on a part 18 of the main frame of the apparatus. As appears in FIG. 2, the rail is located centrally of the width of the apparatus. The rail 16 extends through a guide or tracking member 19 in the form of a ball race (ball bushing) and forms therewith a coupling which is substantially without play but offers negligible resistance to movement of the tracking member along the rail or arcuately around the rail. The tracking member is rigidly secured to a plate 20 to which the scanning unit is secured. Therefore the scanning unit can move bodily along the interior of the casing 1, beneath the document support, and can rock transversely about the axis of the rail as suggested by the double-headed arrow 21 in FIG. 2. Any initial play between the rail 16 and the ball race can be taken up by an adjustment screw 19a (FIG. 4a) on the race.

The scanning unit is connected to the plate 20 by an elastically deformable connector 22 located centrally above the rail 16 and centrally with respect to the width of the scanning unit. The connector 22 incorporates a disc spring (e.g. of disc spring according to DIN 2093) which permits fore-to-aft rocking movements of the scanning unit about a transverse axis through said connector. The end of the scanning unit opposite that at which the hinge 22 is located is supported by wheels 25,26 via springs 25a,26a. These wheels run on a horizontal plate 27 secured to the main frame of the apparatus.

At the top of the scanning unit there are bearing members 30,31. These bearing members are in the form of co-axial rolls whose axis of rotation is in a vertical plane through the exposure slot 6 and is fixed relative to the casing of the scanning unit. The bearing rolls make bearing contact with the document support at positions which (in plan aspect of the support) are abreast of the length of the object line of the optical focusing system. The level at which these rolls are mounted is such that they project upwardly, proud of any other part of the scanning unit. The springs 25a,26a bias the scanning unit upwardly about the hinge formed by the connector 22 and consequently serve to keep the bearing rolls 30,31 pressed against the underside of the document-supporting plate 2. Because the springs 25a,26a are located to the sides of the scanning unit they have the effect of centralising the unit about the axis of its transverse rocking motion, i.e. the axis of the rail 16. If the contact lines between the opposed bearing rolls 30,31 and the document supporting plate 2 are at the same level, the bearing pressures at those contact lines are equal.

Figure 4:
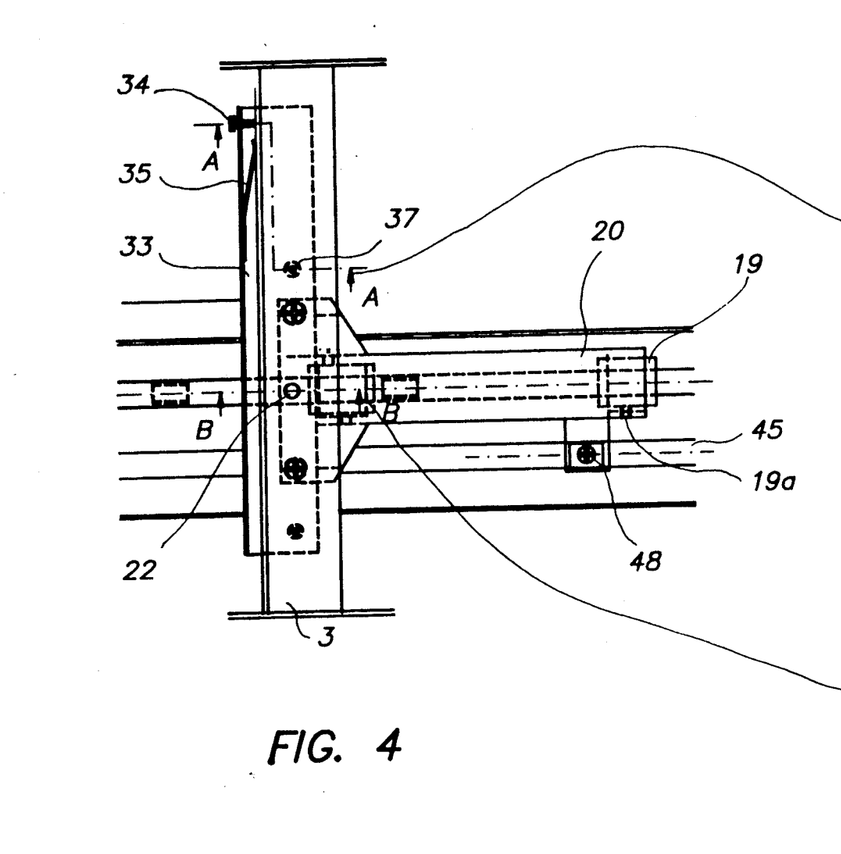
FIG. 4a is a plan view of guide means for such scanning unit.
FIGS. 4b and 4c are sectional elevations on lines Va and Vb respectively of FIG. 4.
Figure 4A:
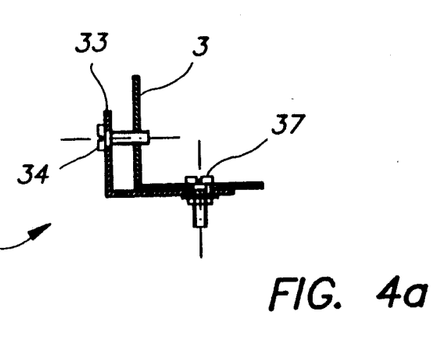
Figure 4B:
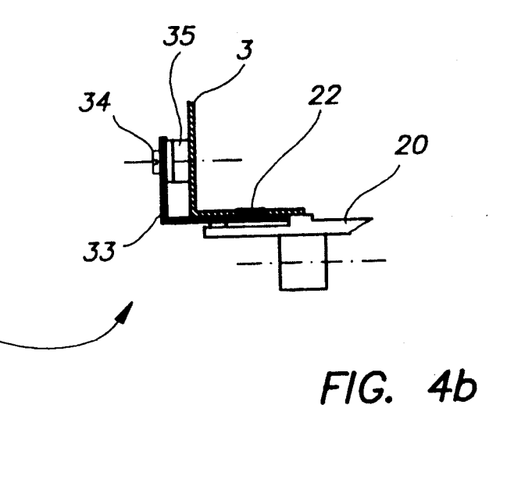
Figure 5:
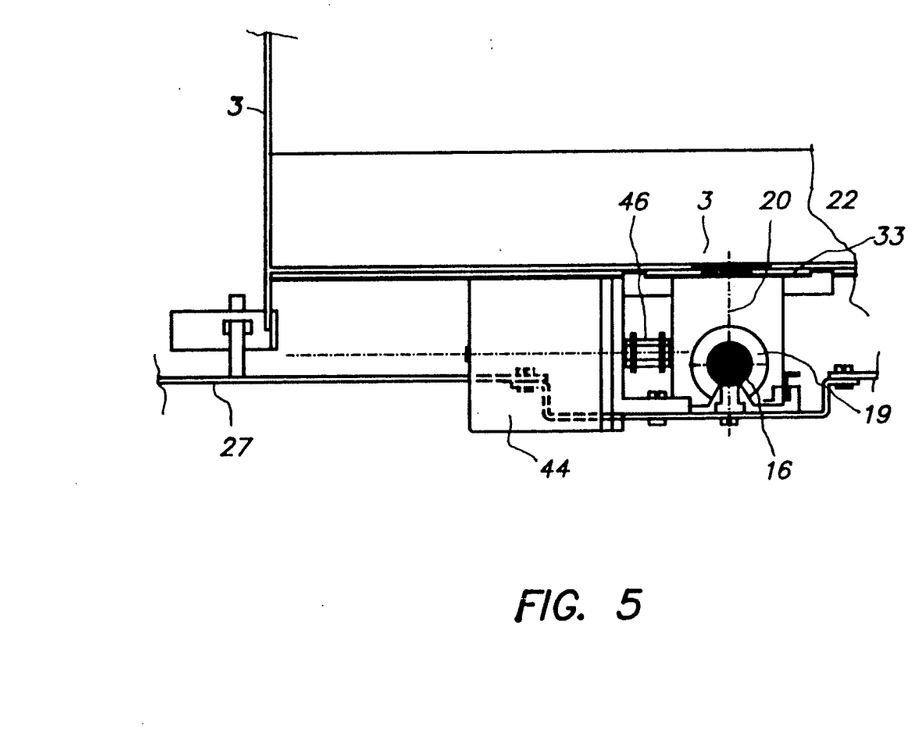
FIG. 5 is a partial end elevation of the apparatus showing details of the drive mechanism of the scanning unit.

The apparatus includes a facility for pre-setting the scanning unit so that its longitudinal axis is truly parallel with the guide rail 16. The means for effecting such adjustment is shown in FIGS. 4a, 4b and 4c. At its hinged end, the scanning unit is seated on and connected to a cross-bearer 33. The connector 22 connects this cross-bearer with the plate 20. The orientation of the scanning unit about a vertical axis through the connector 22 can be adjusted by means of an adjustment screw 34 which passes through a hole in a vertical flange of the cross-bearer 33 and is in screw engagement with the casing of the scanning unit. Rotation of the screw 34 causes fine horizontal pivotal movement of the scanning unit relative to the bearer 33. A spring 35 prevents free play between the screw 34 and the cross-bearer. Once correctly adjusted, the scanning unit is secured in its adjusted position relative to the cross-bearer by tightening clamp screws 37.

Figure 3A:
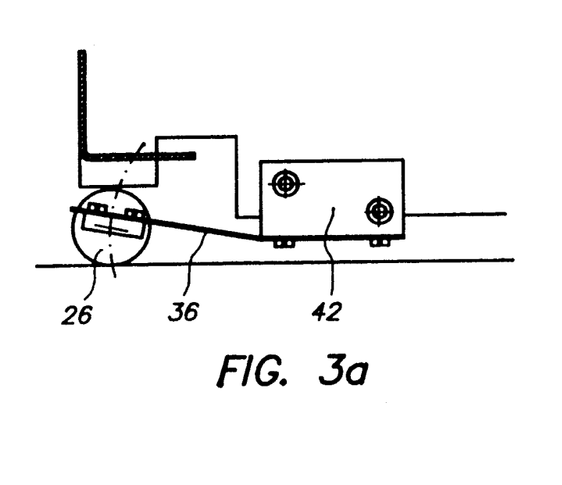
FIG. 3a is a side elevation of a detail of the scanning unit of the apparatus.
Figure 3B:
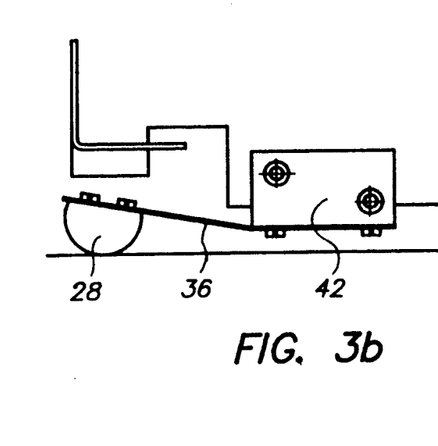

The biasing springs 25a,26a of the scanning unit are of blade type. The spring mounting of wheel 25 is shown in detail in FIG. 3a. The spring mounting of wheel 26 is the same. The wheel 26 is journalled in a bearing which is attached to one end of a blade spring 36. The other end of the blade spring is secured to the scanning unit casing by a bracket 42. FIG. 3b shows a corresponding part of an apparatus in which use is made of a low-friction bearing block 28 instead of a wheel 26.

For scanning a document, the scanning unit is driven along the rail by a driving motor 44 (FIG. 5) which is secured on the plate 27. The unit is driven via a driving belt 45 (FIG. 1) which travels around sheaves 46,47. The upper reach of this belt is secured to the scanning unit by a connector 48. As an alternative to a belt and sheave drive transmission mechanism, a cable and sheave, or toothed belt and sprocket can be used or the drive can be transmitted via a spindle connected to the scanning unit via a worm and pinion or a roll or friction type coupling. Precision drive mechanisms suitable for the purpose are readily available commercially.

It will be apparent that when using the apparatus as described with reference to FIGS. 1–5, the sharpness of the optical image signals transmitted to the sensors 14 is limited only by imperfections (if any) in the geometry of the document supporting plate 2, such as variations in the thickness of the glass from one place to another along or across the plate. By using a truly flat plate which exhibits no or only negligible variations in thickness, the apparatus is capable of producing records of extremely high quality. The mounting of the scanning unit so that it is biased into bearing contact with the document supporting plate by transversely opposed independent springs 25a,25a makes the imaging sharpness substantially free from dependence on the geometry of the main frame of the apparatus on which the scanning unit runs. Moreover, because of the said biasing of the scanning unit into bearing contact with the document-supporting plate, certain kinds of imperfections in the geometry of that plate or inaccuracies in respect of its horizontal mounting, if in fact such imperfections or inaccuracies are present in any given apparatus, are automatically compensated for so that they do not adversely affect image quality.

Figure 6A:
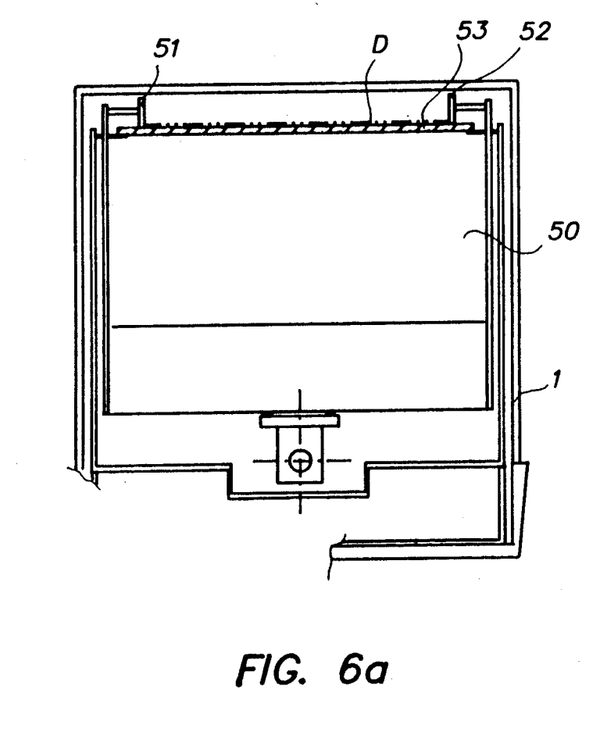
FIGS. 6a and 6b are an end elevation and a side elevation respectively of part of a second scanning apparatus according to the invention.
Figure 6B:
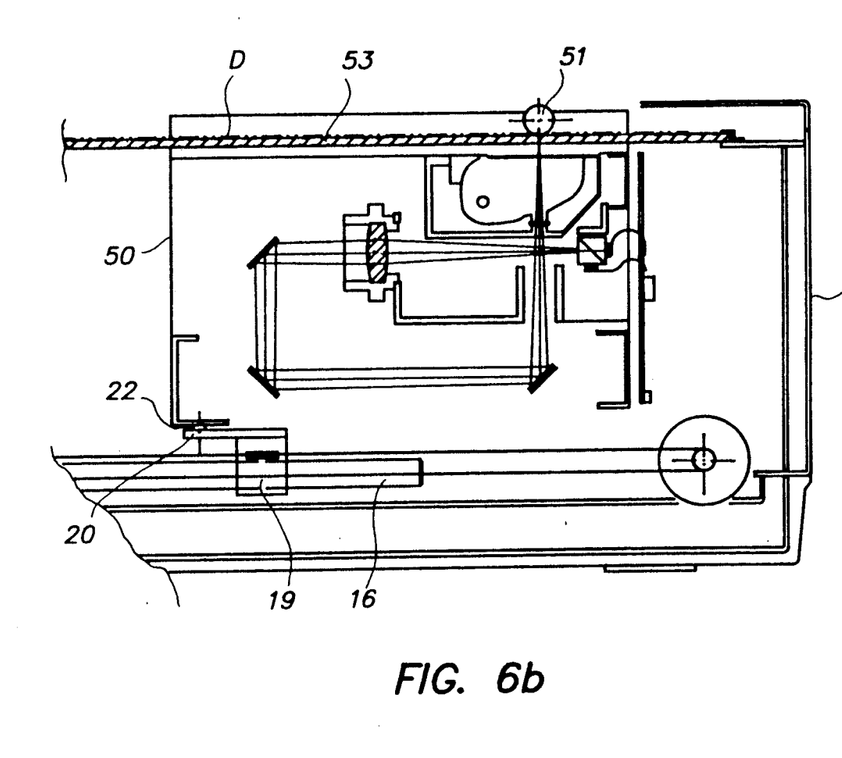

FIGS. 6a and 6b illustrate the scanning unit suspension system of another apparatus according to the invention. The apparatus comprises a scanning unit 50. The guide means of this unit comprises a guide rail 16 and tracking member 19 forming a slide coupling and is the same as the guide means of the apparatus described with reference to FIGS. 1 to 5. The internal parts of the scanning unit, i.e. its light-source, focusing system and light-sensing means also correspond with those parts of the scanning unit described with reference to FIG. 1 and therefore need no separate description. The scanning unit is shown only in outline in FIG. 6a. The scanning unit has bearing members 51,52 which are located over the top face of a document support 53 on which a document D is placed for scanning. The bearing members are located abreast of the length of the object line of the focusing means. The weight of the unit, acting about its horizontal fore-to-aft horizontal hinge axis through connector 22, maintains the bearing members 51, 52 in bearing contact with the document support during a scanning operation. Variations in the thickness of the document supporting plate have no influence on the attainable image sharpness because the bearing rolls make contact with the same face of the document supporting plate as the document itself.

Figure 7A:
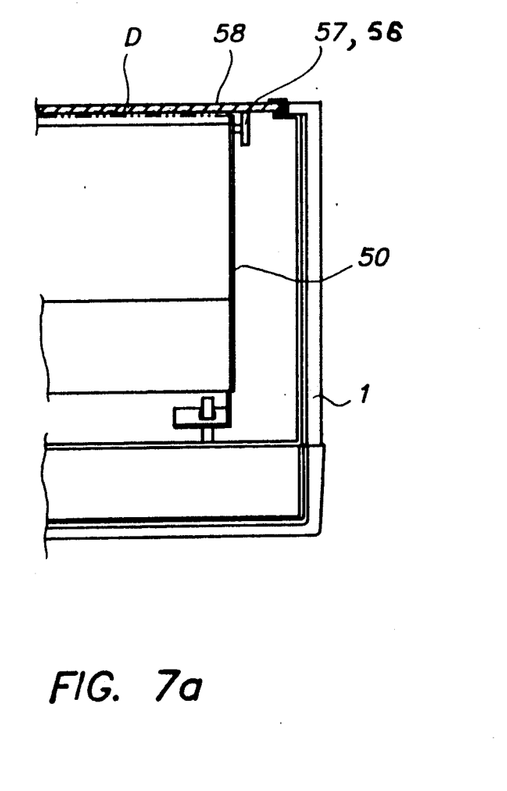
FIGS. 7a and 7b are an end elevation and a side elevation respectively of part of a third scanning apparatus according to the invention.
Figure 7B:
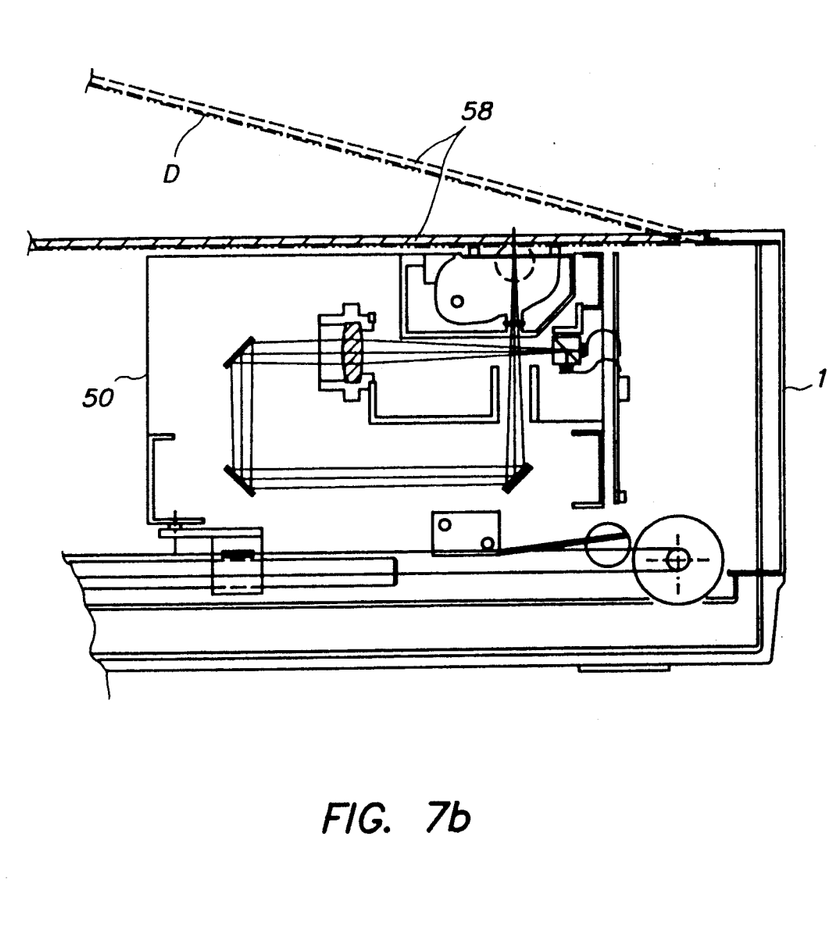

FIGS. 7a and 7b show apparatus wherein the scanning unit (whose guide means and internal parts are also similar to those of the apparatus according to FIGS. 1 to 5) has bearing rolls 56,57 which project upwardly above other parts of the unit and which bear against the underside of a document supporting plate 58 under a force exerted by spring means (not shown) which may be similar to the leaf suspension springs of the apparatus according to FIGS. 1-5. The plate 58 can be raised from its working position as indicated in FIG. 7b so that a document D to be copied can be located against the underside of the plate 58. Any holding means as hereinbefore referred to can be used for holding the documents against the plate. Preferably the plate 58 forms part of a vacuum box.

While the various illustrated apparatus have bearing members in the form of rolls, bearing members of other form can be used, e.g. bearing members in the form of blocks or pads which make sliding contact with the document support.

Instead of incorporating light sensors for transducing the optical image signals into electrical signals, e.g. for digital processing in a host computer, the apparatus could incorporate a photoconductive receptor whereon the incident light pattern is converted to an electrostatic image. Alternatively apparatus according to the invention having a scanning unit biased into bearing contact with a document support as illustrated in the drawings can be constructed as or form part of a recording apparatus of some other kind, e.g. a thermographic printer or facsimile apparatus.

We claim:

1. Optical scanning apparatus wherein there is a document (D) support (2,53,58), a light source (7) for irradiating a document located against said support (2, 53, 58), a scanning unit (3,50), means (16,19) for positively guiding said unit along a predetermined scanning path relative to said document support, and means (44,45) for driving said unit along said path; said scanning unit comprising light-sensitive means (14). and focusing means (10) which during a scanning movement of the unit successively exposes said light-sensitive means to light images of successive lines of information displayed by said document; characterised in that said scanning unit has bearing members (30–31,50–51,56–57) for making bearing contact with a face of said document (D) or document support (2,53,58) and thereby determining the optical distance between that face and said focusing means (10), and in that said unit (3,50) is mounted so that it is under (a) biasing force(s) which maintain(s) its said bearing members (30–31,50–51,56–57) in running contact with said document or document support during a scanning movement of the unit.

2. Apparatus according to claim 1, wherein said bearing members (30–31,50–51,56–67) make local bearing contact with said document (D) or document support (2,53,58) on opposite sides of the scanning path of the unit and abreast of the object line of the focusing means (10).

3. Apparatus according to claim 1, wherein the scanning unit (3,50) is free to undergo lateral rocking movement against (a) said biasing force(s).

4. Apparatus according to claim 1, wherein the scanning unit (3,50) is mounted so that both lateral and fore-to-aft rocking movements can occur against (a) said biasing force(s).

5. Apparatus according to claim 1, wherein the guide means (16,19) for guiding the scanning unit (3,50) along the scanning path comprises a mono-rail track (16) and a tracking member (19) which co-operates with the rail to form a coupling which is located centrally of the width of said scanning path, said coupling being substantially without free play but permitting lateral rocking movements of the tracking member around the axis of said rail, and wherein the scanning unit (3,50) is connected to said tracking member by hinge means (22) which allows fore-aft rocking movement of said unit relative to said guide rail (16).

6. Apparatus according to claim 5, wherein said track (16) is formed by a guide rail of generally circular section and the tracking member (19) is constituted by a ball race.

7. Apparatus according to claim 1, wherein the document support (2,58) is located above the scanning path of the scanning unit (3,50), and said biasing force(s) is (are) exerted by spring means (25a,26a) which urges the unit upwardly towards such support.

8. Apparatus according to claim 7, wherein the said spring means comprises independent springs (25a,26a) disposed at opposite sides of an axis about which the scanning unit (3,50) is free to undergo lateral rocking movement.

9. Apparatus according to claim 8, wherein said independent springs (25a,26a) carry support members (25,26) which run in contact with one or more fixed parts of the apparatus.

10. Apparatus according to claim 1, wherein said document support is a light-transmitting plate on the top face of which a document can be placed for scanning.

11. Apparatus according to claim 1, wherein the bottom face of said document support (58) is accessible to permit a document to be held against that face of the support for scanning.

12. Apparatus according to claim 11, wherein the document support (58) is displaceable from an operative position into an inoperative position to give access to its said bottom face.

13. Apparatus according to claim 1, wherein the document support (53) is located above the scanning path of the scanning unit (3,50), the bearing members (51,52) of that unit bear against the top face of that support or a document thereon, and the weight of the unit itself acts as a said biasing force which maintains said bearing contact during a scanning movement of the unit.

14. Apparatus according to claim 1, wherein the document support (2,53,58) forms part of a vacuum box.

* * * * *

UNITED STATES PATENT AND TRADEMARK OFFICE
CERTIFICATE OF CORRECTION

PATENT NO. : 5,194,898

DATED : March 16, 1993

INVENTOR(S) : DIRK L. COSTROP ET AL

It is certified that error appears in the above-identified patent and that said Letters Patent is hereby corrected as shown below:

Col. 8, line 41, change "Optical" to --In an optical--.

" " , change "wherein there is" to --including--.

" " , after "a", insert --normally fixed--.

" , line 42, cancel "(D)".

" " , before the comma, insert --for supporting a document (D) having lines of information thereon--.

" , line 43, after "irradiating", change "a" to --said--.

" " , change "located against" to --arranged on--.

" , line 52, change "; characterized in that said scanning unit has" to --in combination, the improvement comprising--.

" , line 53, change "30-31, 50-51, 56-57" to --30,31, 50,51, 56,57--.

" " , before "for", insert --on said scanning unit--.

" , line 57, change "in that" to --means for applying--.

" , lines 57 and 58, change "is mounted so that it is under (a) biasing force (s)" to --al least one biasing force--.

" , line 58, change "maintain(s)" to --maintain--.

" , line 59, change "30-31, 50-51, 56-57" to --30,31, 50,51, 56, 57--.

UNITED STATES PATENT AND TRADEMARK OFFICE
CERTIFICATE OF CORRECTION

PATENT NO. : 5,194,898

DATED : March 16, 1993

INVENTOR(S) : DIRK L. COSTROP ET AL

It is certified that error appears in the above-identified patent and that said Letters Patent is hereby corrected as shown below:

Continued:

Col. 8, line 63, change "30-31, 50-51, 56-67" to --30,31, 50,51, 56,57--.

" , line 65, change "on opposite sides" to --at points spaced apart transversely--.

" , line 66, change "abreast" to --coincident with the intersection with the document--.

Col. 9, line 3, cancel "(a)" and "(s)".

" , line 6, cancel "(a)".

" , line 7, cancel "(s)".

" , line 15, change "movements" to --movement--.

" , line 26, cancel ""(s)".

" , line 27, cancel "(are)".

" , line 29, cancel "the".

Col. 10, line 6, before "one", insert --at least-- and cancel "or more".

" . line 7, change "parts" to --part--.

" , line 9, change "the" to --a--.

" , line 12, change "the" to --a--.

" , line 18, cancel "its".

UNITED STATES PATENT AND TRADEMARK OFFICE
CERTIFICATE OF CORRECTION

PATENT NO. : 5,194,898

DATED : March 16, 1993

INVENTOR(S) : DIRK L. COSTROP ET AL

It is certified that error appears in the above-identified patent and that said Letters Patent is hereby corrected as shown below:

Continued:

Col. 10, line 23, change "the" to --a--.

" , line 25, cancel "a".

Signed and Sealed this

Twenty-third Day of November, 1993

Attest:

BRUCE LEHMAN

Attesting Officer   Commissioner of Patents and Trademarks